US011063432B2

(12) United States Patent
Stewart et al.

(10) Patent No.: US 11,063,432 B2
(45) Date of Patent: Jul. 13, 2021

(54) SYSTEM AND METHOD FOR INCORPORATING DISTRIBUTED ENERGY GENERATION IN LEGACY ELECTRICITY GENERATION AND DISTRIBUTION SYSTEMS (71) Applicant: Edge Electrons Limited, Hong Kong (HK)

(72) Inventors: Neal George Stewart, Makati (PH); Jian Carlo Decena Zapata, Pampanga (PH)

(73) Assignee: Edge Electrons Limited, Hong Kong (HK)

( * ) Notice: Subject to any disclaimer, the term of this patent is extended or adjusted under 35 U.S.C. 154(b) by 153 days.

(21) Appl. No.: 16/535,065

(22) Filed: Aug. 7, 2019

(65) Prior Publication Data

US 2019/0363536 A1    Nov. 28, 2019

Related U.S. Application Data (63) Continuation-in-part of application No. 14/979,475, filed on Dec. 27, 2015, now abandoned, which is a continuation-in-part of application No. 14/511,187, filed on Oct. 10, 2014, now Pat. No. 9,819,185.

(51) Int. Cl.
H02J 3/46 (2006.01)
H02J 3/06 (2006.01)
H02J 3/12 (2006.01)
H02J 3/28 (2006.01)
H02J 3/38 (2006.01)

(52) U.S. Cl.
CPC .................... H02J 3/06 (2013.01); H02J 3/12 (2013.01); H02J 3/28 (2013.01); H02J 3/383 (2013.01); H02J 3/46 (2013.01)

(58) Field of Classification Search
CPC ....................................................... H02J 3/06
USPC ......................................................... 307/24
See application file for complete search history.

(56) References Cited

U.S. PATENT DOCUMENTS

2016/0079752 A1* 3/2016 Matan ............... H02J 13/00028
307/24

* cited by examiner

Primary Examiner — Rexford N Barnie
Assistant Examiner — Dru Parries
(74) Attorney, Agent, or Firm — Idea Intellectual Limited; Margaret A. Burke; Sam T. Yip (57) ABSTRACT In the present legacy electrical power generation and distribution system, the power quality delivered to end consumers is being degraded by a number of disruptive technologies and legislative impacts; especially with the rapidly increasing myriad of privately owned and operated domestic and commercial distributed energy generation (DEG) devices connected at any point across a low voltage (LV) distribution network. The present invention bypasses this increasing critical DEG problem by offering a solution comprising an energy processing unit (EPU) that is installed at the edge of the high voltage (HV) transmission grid.

10 Claims, 5 Drawing Sheets

SYSTEM AND METHOD FOR INCORPORATING DISTRIBUTED ENERGY GENERATION IN LEGACY ELECTRICITY GENERATION AND DISTRIBUTION SYSTEMS

CROSS-REFERENCES TO RELATED APPLICATIONS

This application is a Continuation-in-part of U.S. patent application Ser. No. 14/979,475; the disclosure of which is incorporated herein by reference in its entirety. This application is also related to the U.S. patent application Ser. No. 14/511,187 filed Oct. 10, 2014, U.S. Pat. No. 9,148,058 and its corresponding PCT International Application No. PCT/CN2014/089721 filed Oct. 28, 2014, U.S. patent application Ser. No. 14/565,444 filed Dec. 10, 2014 and its corresponding PCT International Application No. PCT/CN2014/093475 filed Dec. 10, 2014; the disclosures of abovementioned applications are incorporated herein by reference in their entirety.

FIELD OF THE INVENTION

The present invention generally relates to electrical power generation and distribution. Particularly, the present invention relates to methods and systems for solving the increasing power quality degradation of the present legacy electrical system because of evolving technology and legislative impacts, such as distributed energy generation (DEG).

BACKGROUND

The present legacy electrical system and power quality being delivered to users is being degraded by a number of disruptive technology and legislative impacts, especially with the rapidly increasing myriad of privately owned and operated domestic and commercial distributed energy generation (DEG) devices connected at any point across a low voltage (LV) power distribution network. This increasing degradation in power quality being delivered to the end consumers, especially voltage volatility, current and frequency aberrations, can negatively impact the performance or even damage electrical equipment, appliances, and electronic devices connected to the electrical power system in the user premises, and can even trip and disrupt wider area LV power distribution network, substation protective equipment, high voltage (HV) transmission grids, and even generators.

Figure 1:
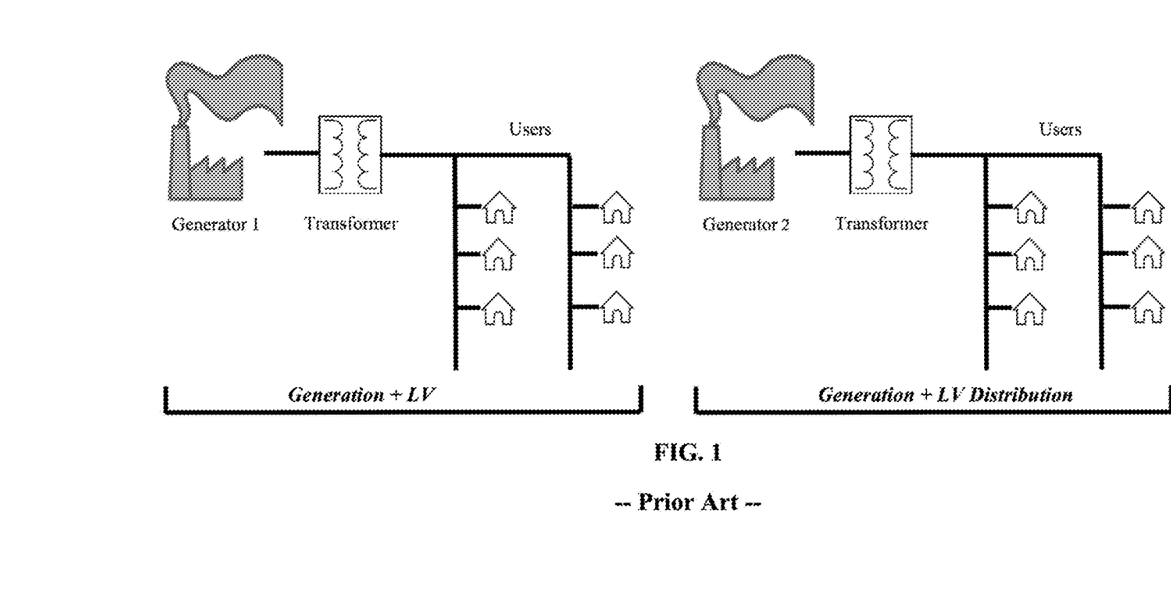
FIG. 1 depicts a logical diagram illustrating the electrical power generation and distribution networks during the late 1800's.

Referring to FIG. 1. The legacy alternate current (AC) electrical power systems that started in the later 1800's had limited transmission capabilities due to low voltage components, and over short distances. So a myriad of separate independent power producers (IPP's) sprang up with a central generator and supplied power to local areas or local power islands. Back then, there were a range of voltages and various frequencies for each local area or local power island. The loads were simple which comprised largely incandescent electrical lighting.

Figure 2:
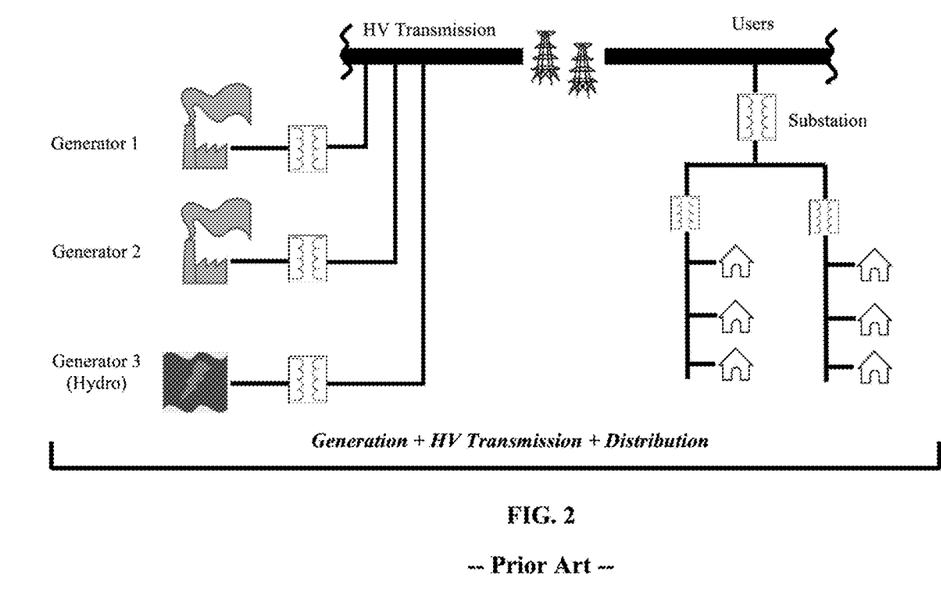
FIG. 2 depicts a logical diagram illustrating the electrical power generation and distribution networks during the 1900's.

Referring to FIG. 2. As electrical technologies advanced, with HV insulators and switches, transmission voltages were allowed to be increased, hence enabling the delivery of higher electrical power over longer distances. Voltage levels increased rapidly from Edison's initial 220 VDC local grids, to the first AC grids of 2.3 KVAC (1893), rising every few years to 765 KVAC (late 1960's). With longer transmission grids resulted in overlapping power islands, conflicts began in areas of business, competing technical standards, and finally monopolies emerged. With the increasing use of electrical power, questionable reliability, and growing conflicts in the electrical industry, many countries moved to legislate regulatory controls over their electrical industries.

In the United States, it became critical that the rapidly growing electrical industry be regulated to create national standards that also would allow multiple grid interconnections to create stable power networks across the country with the goal of delivering high quality reliable power to the consumers. The Federal Government in the 1992 Congress passed the Energy Power Regulatory legislation at the Federal level. The Federal Energy Regulatory Commission (FERC) was charged with regulating power quality from the central power utilities, which owned the generators, transmission, and distribution networks end-to-end. Then in 1996, in order to increase competition and optimize the cost of electrical power, FERC deregulated the electrical industry further and ruled that generation, transmission and distribution of electrical power must be conducted by legally separate entities. This created the competitive market for wholesale power available on the transmission grids with the generators selling and the distributors purchasing wholesale power from the transmission companies.

Many countries enacted similar deregulated competitive electrical power structures in the 1900's. In the United States, after a major North East Blackout in 1965, the North American Reliability Council (NERC) was created to maintain and enforce system standards and power quality reliability. Then again, after another major Blackout in North East and Canada Aug. 14, 2003, the Federal Government in June 2007 passed even tighter regulatory laws and penalties on the transmission operators mandated legally by the NERC working with FERC.

Figure 3:
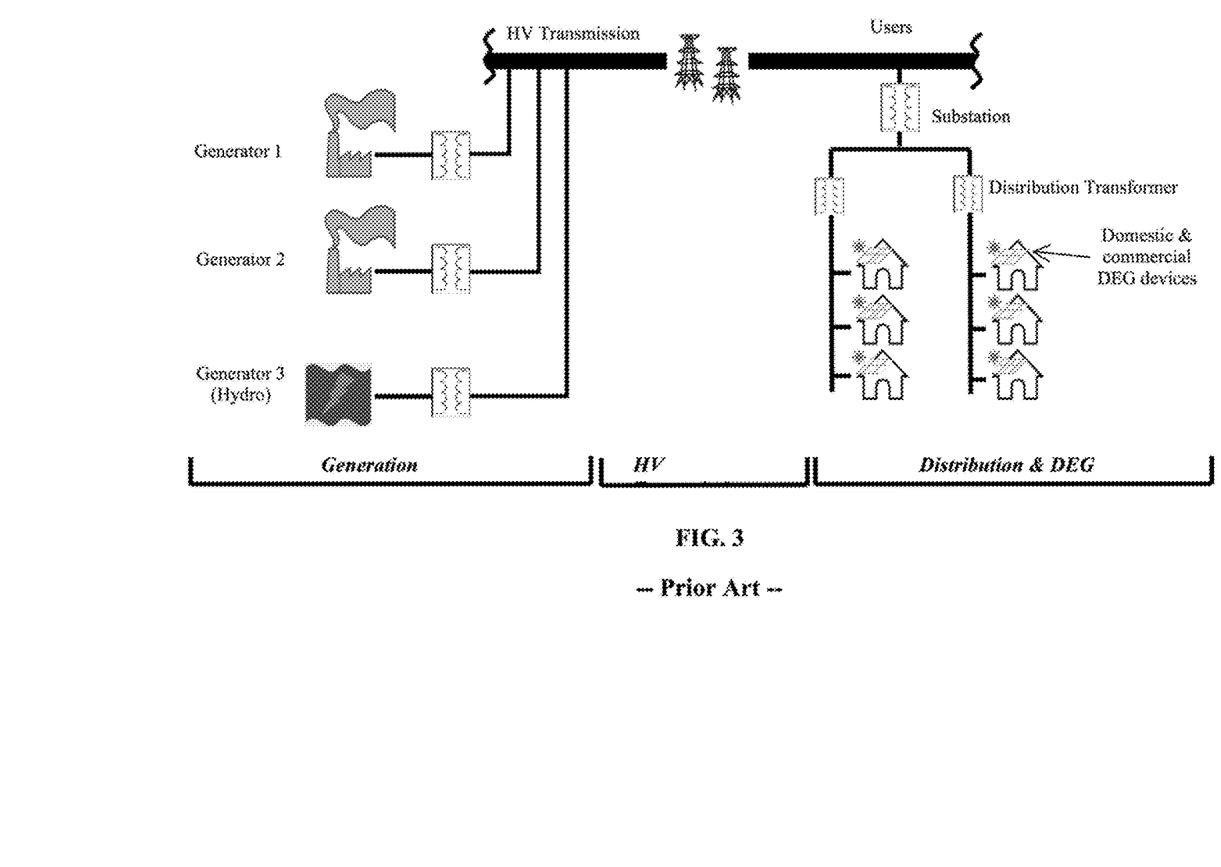
FIG. 3 depicts a logical diagram illustrating the present day electrical power generation and distribution networks with DEG devices but without the present invention.

Referring FIG. 3. Reaching the present day, what came with the deregulation legislation was DEG, which was the ability of connecting small power generators to the HV transmission grids. With still further technology advances in power generation such as CHP micro-turbines, fuel cell installations, and especially renewable energy sources such as photovoltaic (PV), solar thermal, and wind, coupled with falling capital costs, private owners in domestic and commercial premises have stated purchasing and installing these small DEG devices.

These small privately owned and operated domestic and commercial DEG device installations accelerated with the introduction of then later updated and modified Feed in Tariff (FIT) policy over the last few years. The FIT mandates transmission operators to pay owners of DEG devices minimum prices for excess power being generated and added back into the energy grid. So now with a myriad of privately owned and operated domestic and commercial DEG devices, connected in increasing numbers to the local LV distribution networks, it is creating a large impact on power quality for not only the end consumers, but the increasing real possibility of wide area major grid disruptions. Especially with the increasing chances of a transmission grid trip due to the reduction of spinning reserves with the offloading of the large central utilities due to additional power being generated by the growing number of installed DEG devices. The resultant voltage, current and frequency aberrations from these privately owned and operated domestic and commercial DEG devices that are superimposed onto the distribution networks and transmission grids increases the possibility of setting off the system trip protective switch gear, normally adjusted to the tight tolerance and long established legacy electrical power specifications.

Furthermore, because of these increasing voltages on the distribution networks, when over the regulated voltage limits the DEG interface control electronics disables the DEG interface, it does not only shut off any DEG energy recovery from the DEG installation but also eliminates any FIT recovery for the end consumers. Hence the more DEG interfaces connect along a local distribution network, for example a neighborhood of domestic PV installations, as the distribution network voltages increase because of the amount of excess energy being delivered into the distribution network by the DEG installations, the more number of these DEG interfaces will be disabled by the DEG interface control electronics, with no energy recovery or FIT for the end consumers.

Power quality is defined under the following specifications, the key parameters being consistent and stable voltage, harmonics, and frequency of the electrical power delivered to the user. With the advent of more and more electronic devices and equipment being connected to the electrical system which are complex electrical loads, especially with the increasing power demand being domestic and commercial, rather than industrial such as in the United States, these electronic devices, since they offer more complex loads to the electrical system, they can introduce electrical power instability, and these electronic devices are generally located in domestic and commercial premises with increasing power demands from the LV distribution networks, adding to the voltage instability with changing loads and power factors across the distribution networks.

When the legacy central generating utilities owned the complete equation of generation, transmission and distribution end to end, they agreed to, and could meet, the legislated tight power quality standards specified and enforced by government and regulatory bodies. With the advent of even further de-regulation of the electricity industry in many countries, and expanding FIT, allowing the connection of an increasing myriad of privately owned and operated domestic and commercial DEG devices to the LV distribution network and increasing complex loads and changing power factors, there is an increasing critical degradation of power quality especially voltage instability and increased potential of local and large area major power disruptions.

Electrical equipment, appliances, electronics, and especially electrical motors, are all designed to perform optimally at the legislated voltage and frequency tight set legacy standards. Electrical and electronic devices subjected to these voltage and frequency aberrations, outside the set tight legacy tolerances, can malfunction, degrade performance, and even be damaged.

These power quality standards have a long history of regulatory normalization across each country, and even across the world, particularly with the advent of electrical transmission major grid connections between countries. Examples of electrical LV distribution mains standards by some countries are as follows, referencing nominal voltage, voltage tolerance, nominal frequency, and frequency tolerance, for the LV distribution network for domestic and commercial users:

| Country | Regulatory | Nominal Voltage (VAC RMS) | Voltage Tolerance (%) | Normal Frequency (Hz) | Frequency Tolerance (%) |
|---|---|---|---|---|---|
| USA | FERC/NERC | 120 (1Φ) 240(1Φ) 120/208(3Φ) | ±5 | 60 | ±1 |
| UK | EN50160 | 230 (1Φ/3Φ) | +10, −6 | 50 | ±1 |

Many countries have similar nominal LV Distribution POU voltages such as 220/230/240 VAC (and trending this higher distribution network voltage to 230 VAC), and lower voltages generally 110/115/120 VAC, with frequency now standard at 50 Hz or 60 Hz. Generally 50 Hz for the higher 220/230/240 VAC voltages, and 60 Hz for the lower 110/115/120 VAC voltages, but either frequency is used in some countries due to their electrical power system history. Voltage tolerance can be standardized at ±5%/±6%/+10, −6%/±10%, the maximum tolerance in any country is set at ±10%.

Frequency tolerance is normally standardized in many countries to ±1%, some countries have ±2%, which is the maximum frequency tolerance allowed.

Power quality problems are associated with voltage or frequency deviating outside the specified regulatory set and enforced limits. Voltage magnitude problems can be:

1) Rapid voltage changes;
2) Low frequency voltage change causing flicker;
3) Under voltage dips (under −10%);
4) Overvoltage surges (over +10%)
5) Overvoltage spikes and noise;
6) Voltage unbalance in 3-phase system;
7) Voltage and current harmonics;
8) Power factor (PF)—the phase of the voltage and current being out of phase due to reactive power imbalance referred to as power factor (PF=1, V and I in phase, PF=0, V and I—180° out of phase) can also create not only voltage and current harmonic problems, but also electrical and electronic equipment, and especially in electrical motors, wasted power, under performance, and also possible damage;
9) Current imbalance in the 3-phase system, where each phase is loaded with unequal currents can cause transmission and distribution equipment problems and degraded power quality; and
10) Frequency deviations also can impact performance and operation of electrical and electronic devices, transformers, and electrical motors;

Because of these increasing voltages on the distribution networks, when over the regulated voltage limits the DEG interface control electronics disables the DEG interface hence not only shuts off any DEG energy recovery from the DEG installation but also eliminates any FIT recovery for the user. Hence the more DEG interfaces connected, for example domestic houses, along a local distribution network, for example a neighborhood of domestic PV installations, as the distribution network voltages increase because of the amount of excess energy being delivered into the distribution network by the DEG installations, a significant number of these DEG interfaces will be disabled by the DEG interface control electronics, with no energy recovery or FIT for the users.

All of these power quality issues degrade the power quality being delivered to users, especially voltage instability across and through the LV distribution network at POU, where now, in addition, the myriad of privately owned and operated domestic and commercial DEG devices being connected, excess power generated by these DEG devices is being loaded back onto the local LV distribution network. Also, these privately owned and operated domestic and commercial DEG devices, even though they have to meet performance test specifications, IEC 61215 (Ed. 2—2005) and IEC 61646 (Ed. 2—2008), they can still set up widely varying voltage, frequency and rapid power fluctuations, on the local LV distribution network at POU. These domestic and commercial DEG devices are small PV installations, micro-wind, micro-hydro, CHP micro-turbine, CHP fuel cells, and possibly hybrid automobiles in the future. Also, these problems can also reduce the efficiency of electrical power usage in the electrical and electronic loads at the POU. For example electrical motors waste power when they are driven at a higher voltage than the electric motor was designed for optimal performance, and also excessive PF, voltage and current unbalance and harmonics can not only decrease efficiency but also can damage these sensitive electrical and electronic loads.

The large renewable industrial PV, solar thermal, wind and hydro installation need large physical areas away from population centers, the power users, hence the large industrial installations need end-to-end HV transmission over generally long distances, so these large installations can be owned and controlled by the utility generator, hence can meet and be responsible for the transmission operator regulated power quality standards.

The advantage of the large numbers of small privately owned and operated domestic and commercial DEG devices, is the power is generated locally, close to the users or POU, through the LV distribution network. But the owners of these privately owned and operated domestic and commercial DEG devices, purchase, install and operate these DEG devices, but have no responsibility for the impact on the local LV distribution network power quality. These legacy local LV distribution networks in most cases were not initially designed for large number of domestic and commercial DEG devices to be connected. So there is a real and increasing concern by the regulatory bodies, with the increasing penetration of these privately owned and operated domestic and commercial DEG devices, not only user power quality being degraded, but local power instability on the LV distribution networks. Added to this is the increasing connection of complex loads, changing power factors, and changing loads across the distribution networks. This results in increasing service disruptions over even large areas and even HV transmission grids due to voltage, current, or frequency aberrations outside the tight tolerance electrical standards that can trip voltage, current, or frequency electrical system safety and protection devices, causing electrical disruptions and outages. Also because of these increasing voltages on the distribution networks, when over the regulated voltage limits, the DEG interface control electronics disables the DEG interface; thus not only shuts off any DEG energy recovery from the DEG installation but also eliminates any FIT recovery for the user.

The electrical power industry and regulatory bodies are grappling with this new and disruptive evolution in the legacy electrical system. Suggested solutions to this increasing and real problem are all aimed at maintaining the legacy and historical transmission and distribution network structure and power quality tolerances.

One significant book, which is dedicated solely to the looming problem of increasing penetration of privately owned and operated domestic and commercial DEG devices is titled "Integration of Distributed Generation in the Power System", authored by Math Bollen and Fainan Hussan. The content of which is incorporated herein by reference in its entirety. This book was only recently published in 2011 by IEEE, and the book represents a detailed in-depth-study of over a 10 year period, all related to the disruptive evolution of privately owned and operated domestic and commercial DEG devices on power quality.

This book has 470 references, and is excellent in its in-depth research on detail to the increasing critical aspects of the disruptive impact of DEG devices on the overall electrical power system. Many authors and institutions present similar solutions to solving this problem, the same solutions as also covered fully in detail in this book, and again all aimed at maintaining the legacy electrical standards power quality tolerances, by protecting and controlling the HV transmission grid and LV distribution networks. But again, all of these solutions suggested are solely to maintain these historical, long established over many decades, of legacy tight tolerance electrical industry standards. This deeply researched and detailed book finally concludes in its recommendations to address the critical problems of the increasing connection of larger numbers of privately owned and operated domestic and commercial DEG devices, is by adding a layer of digital communication networks to link the DEG devices back to controlling and protecting the HV transmission grids, or even this digital communication network can precipitate tripping voltage protection relays on the distribution network feeders, or even disconnecting DEG devices if say overvoltage results. The book also suggests various schemes of adding storage, and other load shifting actions based upon the added digital communication network of shifting reserves to customers or DEG devices.

The book also concludes another possible conventional solution because of the concerns of the large cost, time, and complexity involved to add the extensive sophisticated digital communication networks and software algorithms that would be required, so in their final paragraph on page 470—"Next to these advanced solutions, the classical solution of building more stronger lines or cables should not be forgotten. However, the introduction of new types of production will require use of advanced solutions in more cases than in the past. By combining the classical and advanced solutions, the power system will not become an unnecessary barrier to the introduction of distributed generation."

So this last paragraph of the book on page 470, sums up their concerns of the increasing penetration of privately owned and operated domestic and commercial DEG devices on the LV distribution network in particular, and its potential critical impact on the stability of the overall electrical grid. They propose advanced digital communication networks and software solutions ("Smart Grid"), but also suggest a simple, but expensive, conventional physical solution in adding more copper wire to the existing LV distribution networks that will increase the power handling capability and reduce Voltage instability by decreasing the resistance of the wires in the present LV distribution networks as these DEG devices add increasing and volatile power onto the local LV distribution networks. These LV distribution networks were initially not designed, and certainly this new DEG problem, not anticipated, with this recent evolution of the connection of large numbers of privately owned and operated domestic and commercial DEG devices.

The last paragraph in this detailed book underlines clearly that:

1) All solutions suggested are aimed and still meeting the present tight tolerances of the historical legacy Regulated and enforced electrical standards for power quality;
2) Connection of large numbers of privately owned and operated domestic and commercial DEG devices to the local LV distribution networks is a major problem, as the LV distribution networks were not initially designed to handle this new disruptive electrical evolution, hence the suggestion of physically upgrading these LV distribution networks underlines the complexity of this real and critical problem;
3) The book's last line suggests, because of the complexity and cost and time for these advanced complex "digital" solutions ("Smart Grid"), that just adding additional copper wires to the present LV distribution network will help. But that is also a very expensive solution, to upgrade physically the LV distribution networks, and will take many years to complete;

4) With these critical problems now happening with the degradation of power quality and possible widespread transmission grids tripping, there may be legislative moves to limit the number of privately owned and operated domestic and commercial DEG devices allowed to be installed;

5) The book also has no suggestion on who would be responsible for the costs of the huge digital communication software network and who has final responsibility for power quality delivered to the user; and 6) Again, the book, and all suggestions in the industry, surrounding this recently evolving DEG devices problem, is the underlying, totally accepted without question, in maintaining the historical, legacy, Regulated power quality tight specifications and framework, and still meeting the decades old legacy electrical system power quality tight tolerance standards.

SUMMARY

So far, solutions that have been proposed by the industry attempt to solve this increasing critical problem due to the introduction of DEG by targeting the power generation, HV transmission, and/or LV distribution without real success. The present invention, on the other hand, approaches the problem by targeting not at fixing the generation or HV transmission grids, but instead sections of a LV distribution network, across a microgrid or sections of the microgrid LV distribution network, across a specific power island or sections of the power island LV distribution network so that high quality power can be restored directly at each point of use (POU) or point of common coupling (PCC) connected to the LV distribution network.

The present invention hence transforms the wide voltage variations on the LV distribution network to a tightly voltage-regulated LV distribution network with individual energy process unit (EPU) devices installed directly at the edge of the HV transmission grid, such as along sections of a LV distribution network, across a microgrid or along sections of the microgrid LV distribution network, across a specific power island or along sections of the power island LV distribution network.

In an exemplary embodiment, the EPU devices can be installed on the existing power poles or locations that service individual or a number of end users such as a substation pad installation, or a number of POU/PCC's, or a specific power island local distribution network. These EPU devices are highly functional integrated devices that are specifically designed to have a very wide range of tolerances of voltage variation on the input, and processes the input power to produce a tightly regulated voltage directly at the output, delivered along sections of a LV distribution network, across a microgrid or along sections of the microgrid LV distribution network, across a specific power island or along sections of the power island LV distribution network.

The present invention relieves the legacy LV distribution network in from voltage volatility as it is supplied by tightly regulated voltage with the EPU devices in place. This in turn allows the connection of the increasing numbers of private domestic and commercial DEG devices without degrading the power quality in the HV transmission grid.

BRIEF DESCRIPTION OF THE DRAWINGS

Embodiments of the invention are described in more detail hereinafter with reference to the drawings, in which.

DETAILED DESCRIPTION

In the following description, methods and systems of electrical power generation and distribution and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

With the increasing negative impact to power quality of de-regulation that allows these privately owned and operated domestic and commercial DEG devices to be connected to the LV distribution networks, especially with the further legislation for FIT, and similar allowances in many countries, this is becoming a critical industry problem that is trying to be solved in adding complex digital communication networks and control algorithms to the power grids ("smart grid"). However, this approach is expensive, complex, and will take many years to knit the huge power system together, and in the meantime it will not improve the present situation that allows the connection of an increasing number of privately owned and operated domestic and commercial DEG devices to the distribution networks or solve the increasing addition of complex loads, and changing loads and power factors across the distribution networks.

The major concern expressed by many in the power industry is the stability of the overall power system as the increasing number of privately owned and operated domestic and commercial DEG devices are installed, that will degrade not only the local LV distribution networks, but also can threaten the HV transmission grids as more central generating utilities reduce capacity and spinning reserves due to the increasing energy being generated and loaded onto the LV distribution networks from the DEG devices, and the increasing renewable installations in general. With reduced central generator utilities spinning reserves, and more volatile energy being delivered to the LV distribution networks by the wide array and increasing numbers of privately owned domestic and commercial DEG devices, the increasing chances of network voltage and Frequency tripping, and also the potential of major outages as HV grid faults cannot be rapidly compensated for with insufficient spinning reserves.

One aspect of the present invention is a power distribution system that completely bypasses the critical and increasing problem of the myriad and types of privately owned and operated domestic and commercial DEG devices being installed and connected mainly to the LV distribution networks that were not initially designed, or even anticipated, for the recent DEG evolution coupled with the increasing addition of complex loads, changing loads and power factors across the distribution networks.

The present invention eliminates the problem of degrading power quality by the installing one or more EPU's along the edge of the HV transmission grid—various selected points along the LV distribution network servicing the end users. In the following description, the definition of the edge of the HV transmission grid includes, but not limited to, the edge of the HV transmission grid that connects to one or more LV distribution network, sections of a LV distribution network, across a microgrid or along sections of the microgrid LV distribution network, across a specific power island or along sections of the power island LV distribution network.

Figure 4:
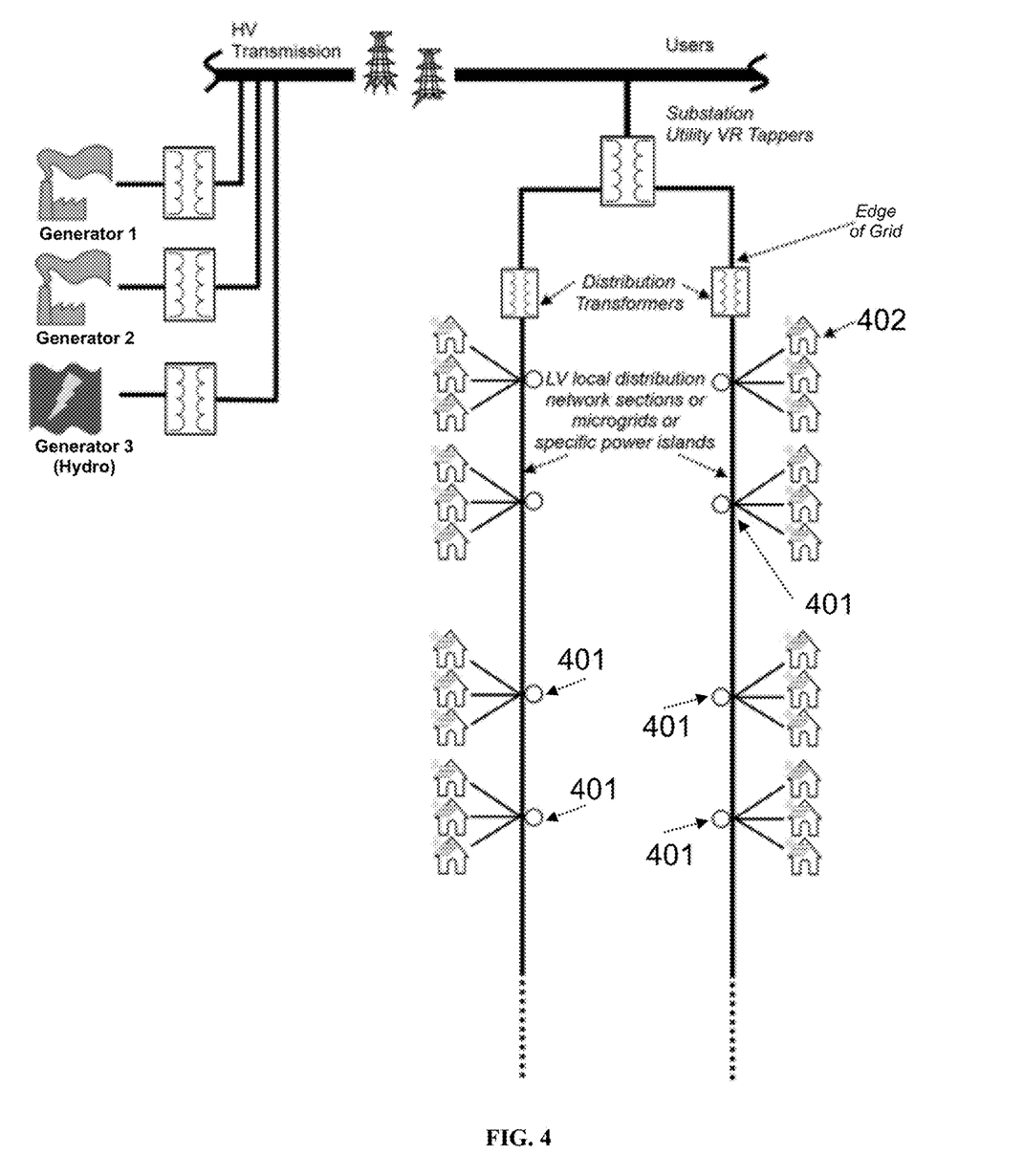
FIG. 4 depicts a logical diagram illustrating an electrical power generation and distribution network with DEG devices and EPU's in accordance to one embodiment of the present invention.

FIG. 4 depicts a logical diagram illustrating an electrical power generation and distribution network with DEG devices 402 and EPU's 401 in accordance to one embodiment of the present invention. In this exemplary embodiment, the EPU's 401 are installed on electric poles or in local pad installations along sections of a LV distribution network. Each of the EPU's 401 is in a series connection with the input and output of each upstream and downstream LV distribution network section. Also in this exemplary embodiment, the voltage instability of each of the LV distribution network sections is mitigated by the bidirectional series voltage regulation method. An ordinarily skilled person in the art will appreciate that the EPU's can be installed at other points along the edge of the HV transmission grid, and that other voltage regulation method well known in the art can be used in lieu or as compliment to the bidirectional series voltage regulation method.

Still referring to FIG. 4. In one exemplary configuration, the input to each of the EPU's 401 can be designed to accept voltage tolerance of +−25%, and deliver a voltage with a series voltage regulation method, specific to the present invention and incorporated in the EPU, at its output designed to be held at +−5%. Hence, for this example, each section of the LV distribution network will be held to the nominal voltage +−5%, regardless of the number of DEG devices 402 being connected to the LV distribution network. The additional power being delivered by the local private domestic and commercial DEG devices 402 is simply passed upstream or downstream through the series EPU devices 401, with each section of the LV distribution network held at +−5% around the nominal LV distribution voltage. With EPU's 401 installed along sections of the LV distribution network, the power quality parameters and tolerances are controlled, especially voltage, along each section of the LV distribution network, in turn with the increased distribution and network stability and high level of power quality at POU and PCC, with the number of DEG devices 402 that can be connected to the LV distribution network being allowed to continue to grow. Furthermore, with EPU's 401 installed along sections of the LV distribution network, excess in energy on POU's with high DEG penetration can be transmitted on to those POU's with high demand to promote energy balance on the distribution networks. This avoids long transmission of energy from the HV lines generated by low efficiency generators.

At the end of the LV distribution network at the substation, the standard large utility voltage regulation tappers, reacts to the increase or decrease in voltage and adjust the voltage level accordingly at the LV distribution substation connection. The HV transmission network that is connected to the LV distribution substation also delivers or absorbs the electrical energy on the LV distribution network. Then the electrical energy is passed upstream or downstream through the bidirectional voltage regulating EPU's 401, holding the sequential LV distribution network sections to a tightly regulated nominal voltage.

The design of the EPU installation scheme depends on each specific application. With the EPU's correcting and holding each section of the LV distribution network to a tight tolerance, additional energy savings can be achieved. This is not possible with the current legacy electrical centralized substation system, especially with the increasing-DEG volatility. In contrast the output voltage of each EPU can be set and held with a close tolerance and the minimum conservation reduction voltage (CVR). For example in Australia, which is moving from a 240 VAC system to 230 VAC system, the minimum voltage allowed is 230 VAC−6%=216 VAC. If each section of the LV distribution network were to be held at 220V+−2%, regardless of the number of DEG devices connected to the LV distribution network sections, because of the set and regulated voltage by the EPU's, the CVR voltage of 220 VAC+−2% would save energy.

Also currently, substations that are close to the edge of the grid through the large substation voltage tappers generally impress higher voltages (over 250 VAC in Australia) onto the edge of the LV distribution networks to achieve the minimum legislated voltage of 216 VAC at the furthest end of the LV distribution network. This is wasting energy at the user facilities close to the substations because of the high voltages. With the EPU's installed along sections of the LV distribution network in accordance to the present invention, these substation voltages can be held to nominal voltage values, thus presenting additional advantages in significant energy saving.

In another configuration in accordance to a preferred embodiment of the present invention, instead of a full series voltage regulator incorporated in the EPU, the EPU can be designed for maximum energy savings utilizing conservative voltage reduction (CVR), so the EPU can be configured with only a voltage decreasing AC voltage regulator in conjunction with a series bypass contactor for lower cost and additional energy savings under the condition of low voltage AC mains. So instead of the EPU utilizing a full series voltage regulator that will boost the voltage up to the set regulated output voltage but will lose the additional energy savings if just an EPU with a voltage decreasing AC voltage regulator is used in conjunction with a series bypass contactor. For example in this energy saving optimization configuration of the EPU, the present invention is related to optimizing energy savings of the EPU and also protecting the electrical loads from overvoltages and energy wasting high AC input voltages above an optimum energy savings level. In the case of the input mains AC voltage falling below a selected optimum level, as if a full series voltage regulator is utilized in the EPU, the full series voltage regulator not only continues to use its internal power electronics to boost the low input AC voltage to the set regulated output AC voltage, the series voltage regulator would increase or boost the input AC mains voltage to the set optimum output energy savings voltage level, then the energy savings would not be optimized under low input mains AC voltage, as the input current hence the input power would increase as the full series voltage regulator increases or boosts the low mains input AC Voltage.

In this preferred embodiment of the present invention, if the input AC mains voltage drops below the optimum energy savings voltage or a lower selected voltage point, the voltage decreasing power electronics in the EPU are switched out to save the voltage decreasing AC voltage regulator internal power electronics usage, and the series bypass contactor is activated, so that the lower mains voltage is directly delivered to the electrical load, hence achieving even more energy savings than in the case if a full voltage increasing series voltage regulator is used in an alternate EPU configuration. The principles of the present invention are readily applicable to any poly-phase AC system, such as a single or 3-phase electrical system.

For example in worldwide electrical systems, the final LV distribution voltages are generally either 110/120 VAC systems, or 220/230/240 VAC systems, although most of the world is standardizing to nominal 120 VAC or 230 VAC systems for LV distribution voltages. Also there are standardized and legislated electrical system specifications, and especially distribution voltage levels and tolerances to be delivered to the switchboards of domestic and commercial premises.

For example in the United States the standard distribution voltage for domestic and commercial premises is 120 VAC (specified by FERC/NERC), and voltage tolerances of maximum of +5%, and minimum of −5%. In the higher voltage 230 VAC systems such as Australia (specified by AS60038), and the UK (Specified by EN50160), the allowed voltages tolerances are specified as a maximum of +10%, and a minimum of −6%. Although it is accepted in the industry that overvoltage levels can be higher, and an overvoltage of +10% and an undervoltage of −10% as extreme limits are still acceptable, these extreme maximum voltages when applied to electronic equipment and appliances, especially electrical motors, that are designed to the nominal specified standard voltages such as 120 VAC in the United States and 230 VAC in Australia and UK, not only waste energy because of the additional higher working voltage, but also do not perform optimally, as motors and transformers can overheat, shorten working life times, and can permanently damage any equipment connected to the electrical system.

So, say for the United States, the voltage range, from a nominal 120 VAC, for a maximum voltage of +5% is 126 VAC, and a +10% overvoltage level of 132 VAC, and a minimum of −5% is 114 VAC, with an undervoltage of −10% of 108 VAC. It is generally accepted in the industry that the transmission and distribution operators in the United States will deliver the minimum voltage of 114 VAC to the premises switchboard, and allowing another 3.5% voltage drop estimated for a minimum of 110 VAC to the actual loads, such as appliances in domestic premises.

To deliver the specified range of voltages within the allowed voltage tolerances from the nominal voltage of 120 VAC to say each domestic or commercial premises on a local power island distribution network, it requires a higher voltage at the input to the local power island distribution network, because of the voltage drop that takes place serially along the physical wires of the distribution network due to the electrical resistance of the wires and system conductors. So typically premises close to the sub-station of the distribution network local power island will see the higher maximum voltage ranges, and further along the local power island distribution network, the lower voltages in the range. So for the United States, the voltage range can be from 126 VAC or even higher, down to 114 VAC or even lower, for a nominal 120 VAC local power island distribution network.

Similarly for the nominal 230 VAC countries, such as Australia and the UK, the voltage range can be from 253 VAC or even higher at the local power island substation, down to 216 VAC or even lower along the distribution network, for a nominal 230 VAC local power island distribution network.

So there have been major investments made into the local power island distribution networks to minimize the tolerances of the delivered mains AC voltage to all domestic and commercial premises, but this has become more difficult due to the increasing usage and complex electronic loads being added into domestic and commercial premises coupled with changing loads and power factors. In the United States for example, there is now more electrical power being used by domestic and commercial premises that industrial usage. With the aforesaid problems associated with DEG, the problems compound dramatically in terms of power system complexity, voltage range volatility, and especially overvoltages.

Electrical and electronic equipment and appliances, especially electrical motors, are specifically design to operate at the nominal specified standard voltages, such as 120 VAC in the United States, and other 120 VAC countries, and 230 VAC in Australia, UK, and other 230 VAC countries. Voltage over the nominal design standard voltage not only can damage the connected electrical and electronic equipment, but they also consume more energy than is necessary, motors and transformers can overheat, hence there is an optimum voltage in general that optimizes the performance and delivers the maximum energy savings. So for example, in an EPU optimized for maximum energy savings utilizing CVR, the optimum energy savings voltage is selected to be the nominal mains voltage −5% to achieve normal equipment performance, and maximize energy savings. So that energy savings set voltage could be 114 VAC for nominal 120 VAC systems, and 220 VAC for nominal 230 VAC systems, or other lower energy saving voltages could be selected, and this is just an example to clearly show the concept.

Therefore, in this preferred embodiment of the present invention, only a voltage decreasing AC voltage regulator is needed working in conjunction with a series bypass contactor, and the output voltage of the voltage decreasing AC voltage regulator is set at energy saving level of 114 VAC for nominal 120 VAC systems, and set at energy saving level of 220 VAC for 230 VAC systems, so under the conditions of extreme or overvoltages the voltage decreasing AC voltage regulator keeps the output voltage to the load at the selected set energy savings voltages. Under the conditions of the input AC mains voltage falling below the energy savings set voltage (in this example 114 VAC for nominal 120 VAC systems, and 220 VAC for nominal 230 VAC systems), if a full series voltage regulator is used, then the full series voltage regulator will not only be using internal power to increase or boost the low input mains AC voltage, but that will not save as much energy as the present invention, as below the set energy saving voltage, the control electronics will sense the low input AC mains voltage, switch off the voltage decreasing AC voltage regulator power electronics saving internal energy, and activate the series bypass contactor, hence the low main AC input voltage is now applied directly to the load, minimizing the voltage drop if the voltage decreasing AC voltage regulator stayed connected in the circuit, and additional energy savings is achieved by this low input mains AC voltage being applied directly to the load through the series bypass contactor. Also when the input mains AC voltage increases above the set energy savings voltage, the series bypass contactor is switched out, and the voltage decreasing AC voltage regulator is activated to regulate the output AC voltage to the load at the energy savings voltage level, regardless of the higher and extreme overvoltages on the LV distribution network.

Furthermore, because renewable grid tie inverters, such as solar grid tie inverters, must also only be allowed to continue injecting renewable electrical power into the LV distribution network if the voltage experienced by the inverters on a section of the LV distribution network is less than the maximum regulated voltages allowed (e.g. in Australia 230 VAC+10%=253 VAC). Thus, for certified solar inverters in Australia experiencing LV distribution network voltages of 253 VAC or more, the inverter must turn off—technically called over voltage lock out (OVLO) mode. As this applies to all countries, it is now well known that a significant percentage of residential solar inverters are turned off due to OVLO, and in turn significantly less than 100% of residential solar energy is being harvested due to high voltages on the LV distribution network. With the EPU's installed on the pole or pad, and tightly regulating the nominal voltage on the LV distribution network, the solar inverters will only experience the regulated voltage output of the EPU's, hence the solar inverters will never turn off or enter the OVLO mode. And since the EPU's are bidirectional, the excess solar renewable energy is passed along the sections of the LV distribution network to the HV transmission tappers at the substation, allowing the installation of large numbers of residential solar installations, with the accompanying 100% solar renewable energy recovery.

In accordance to another aspect of the present invention, the EPU's can be designed to work in a bi-directional digital communication network, which can be used to communicate to a central location the status of the EPU devices and the LV distribution network. This transmitted data can be used to modify the operation of the EPU devices to alleviate LV distribution network problems. Alternatively, each EPU can work autonomously, without the need for any digital communication for lower cost.

With the incorporation of a bi-directional digital communication network, each EPU can be polled and controlled from a central supervisory control and data acquisition (SCADA) location of an overall network controller facility. For example, individual EPU's output voltage can be increased or decreased from the SCADA control. The voltages across the LV distribution network can be increased to enhance network load shedding, or decreased across the network for CVR energy savings. Each EPU can be commanded to activate its internal bypass contactor, in the case of network voltage problems with low substation voltages, utilizing full CVR with increased energy working in conjunction with a series bypass contactor for maximum energy savings under the condition of low AC mains input.

The bi-directional digital communication network can also be used to allow the SCADA control to monitor the status of the EPU devices and the LV distribution network. This monitored status data can be used to modify the operation of the EPU devices to alleviate LV distribution network problems.

Through the bi-directional digital communication network, the SCADA control can command and isolate a local EPU power island to operate as a microgrid. In that local power area, because of the regulated and controlled power quality tolerances on the LV distribution network, the LV distribution network or microgrid can operate and generate high quality power as EPU's installed across the LV distribution network process and distribute any excess power across the sections of the LV distribution network. Similarly in a wider power island area, the overall interaction and operation of the generators, transmission grid, DEG's, and EPU's can be modified to maintain the stability of the power system. And because of the installation of EPU's, with the wider power quality tolerances on the power system, allows much easier overall system control with increased LV distribution network power quality stability.

Also in another configuration an EPU, the subject of this invention, as an example is the Series Voltage Regulation method specific to this invention, the EPU contains additional functions for additional Power Quality improvements that could include PFC (Power Factor Correction), Current and Voltage Harmonic corrections, Current and Voltage unbalances, combined with Series Voltage Regulation method specific to this invention.

There are two ways to regulate voltage on the AC mains, and that is by series voltage regulation, where the AC input and AC output are "decoupled" and just the differential voltage between the unregulated input AC voltage and the specified and fixed regulated output AC voltage is processed by the power electronics. The other method is by shunt current regulation, where the AC voltage is changed by injecting a specified current in shunt or parallel with the mains, and the level of that current is injected or absorbed by the power electronics interfacing with an internal storage device, such as a high voltage electrolytic capacitor. The shunt current regulation method therefore controls the AC mains line voltage by driving or absorbing a specified current interfacing with an internal storage device across the mains line impedance or resistance.

The EPU voltage regulating embodiment in all of the voltage regulating applications of this EPU invention is by the series voltage regulation method. One exemplary embodiment of the implementation of the series voltage regulation method is the series AC high frequency voltage regulator disclosed in U.S. Pat. No. 9,148,058. Another exemplary embodiment of the implementation of the series voltage regulation method is the series AC high frequency voltage regulator disclosed in U.S. patent application Ser. No. 14/565,444.

The series voltage regulating method has major advantages over the shunt current regulator method. Using the shunt current method to regulate the voltage requires significant current generated to change the voltage differential under the conditions where the AC line impedance is very low (typically much less than 1 ohm; in many applications can be less than 0.1 ohm; and is also changing depending on line conditions). So the shunt current regulation method is inefficient and limited in its ability to drive sufficient current into the low line impedances to regulate the voltage over a wide range. In some cases of very low line impedance, it cannot generate or absorb sufficient current to correct to the required voltage. The series voltage regulation method, on the other hand, is highly efficient, does not need an internal storage device such as an unreliable high voltage electrolytic capacitor necessary for the shunt configuration, can regulate an AC output voltage over a very wide range of input AC voltages, is independent of line impedances, and can be operated independently and autonomously as a standalone AC series voltage regulation EPU. As such, in this series voltage regulating method embodiment, the series the voltage regulator in each of the EPU uses a high efficiency single conversion topology having no rectification and has a critical bi-directional power transfer capability.

The are two preferred embodiments of the series the voltage regulation method used by the EPU as implemented by the series AC high frequency voltage regulators as disclosed in U.S. Pat. No. 9,148,058 and U.S. patent application Ser. No. 14/565,444 in accordance to the present invention: the "Direct" method and the "Indirect" method.

FIG. 4 shows the "Direct" voltage regulation method embodiment. In this embodiment, the power electronics of the series AC high frequency voltage regulator are directly connected in series with the LV distribution network conductors, with the low mains frequency (e.g. 50 Hz, 60 Hz, or 400 Hz), and the series AC high frequency voltage regulator is operating at high switching frequencies (e.g. 1 kHz to 1,000 kHz).

In the "Indirect" voltage regulation method embodiment, the power electronics of the series AC high frequency voltage regulator are connected to the primary of a low frequency mains transformer, and the secondary of the low frequency mains transformer is connected in series with the LV distribution network conductors.

As the EPU outputs are positioned on the primary of the low frequency mains transformer, the power semiconductor switching devices in the power electronics are not connected directly to the LV distribution network conductors. With the input of the EPU still connected to the LV distribution network conductors, the power semiconductor switching devices and other components in the power electronics only have to process the differential power required to change the AC voltage at the secondary of the low frequency mains transformer.

"Indirect" voltage regulation is achieved by adding or subtracting the AC voltage across the secondary of the low frequency mains transformer, as the secondary of the low frequency mains transformer is actually connected in series with the LV distribution network conductors. One advantage of the "Indirect" voltage regulation method is the low power level required from the EPU power semiconductor devices and other components in the power electronics, and the EPU only needs to process the power required to drive the differential voltage across the secondary of the low frequency mains transformer. However, since a low frequency mains transformer is typically made of standard silicon transformer steel, it adds significant weight and size due to its operation at the low mains frequency. Lastly, an ordinarily skilled person in the art can appreciate that the bypass mode can be done either across the primary winding, or across the secondary winding, or both. Following the above-mentioned principle, an ordinarily skilled person in the art can adopt various configurations including isolated and non-isolated.

Figure 5:
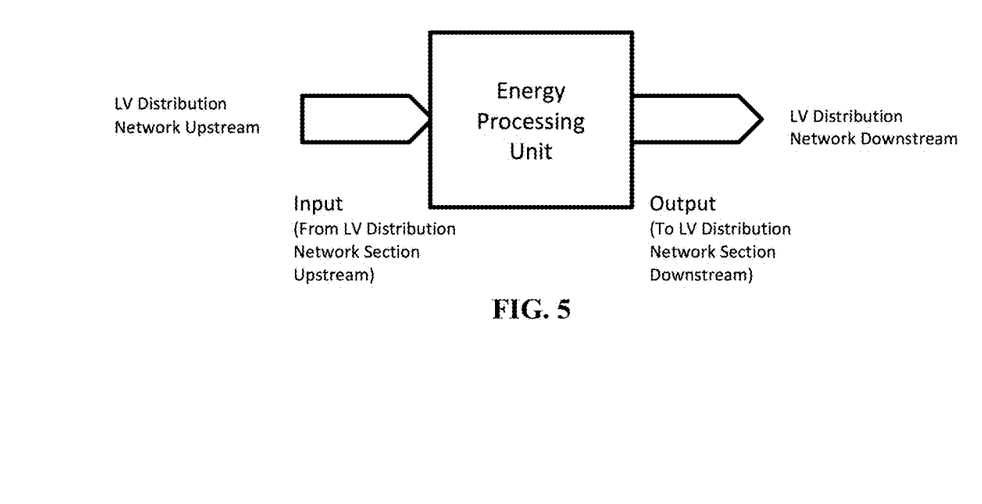
FIG. 5 depicts a block diagram illustrating a configuration of an energy processing unit in accordance to one embodiment of the present invention.

FIG. 5 and Table 1 below show the configuration of an EPU in accordance to one embodiment of the present invention and the following table lists its operating parameters in addressing the aforesaid power qualify problems.

TABLE 1

| Power Quality Problems | Input to EPU | Output to POU | Notes |
| --- | --- | --- | --- |
| 1) Rapid voltage change | V up to ±25% | V ± 2% | Fast electronic control eliminates rapid voltage changes |
| 2) Low frequency voltage change | V up to ±25% | V ± 2% | Eliminates low frequency voltage changes |
| 3) Under voltage dips | V drop to −25% | V ± 2% | Eliminates under voltage dips |
| 4) Overvoltage surges | V up to +25% | V ± 2% | Eliminates voltage surges |
| 5) Overvoltage spikes and noise | V up to ±25% Noise protected | V ± 2% | Eliminates overvoltage spikes and noise |
| 6) Voltage unbalance | V/phase ± 10% | V/phase ± 2% | Balance voltage unbalance |
| 7) Voltage harmonics | THD up to ±10% | THD ± 3% | Elements major voltage harmonic |
| 8) Power factor | PF ≥ 0.98 | PF ≥ 0.5 load PF | Load PF corrected at input |
| 9) Current unbalance | I/phase ± 10% | I/phase ± 2% | Load current unbalance corrected at input |
| 10) Frequency deviation | F ± 5% | F ± 1% | Frequency derivation corrected |
| 11) DEG grid interface control electronics shutoff eliminating DEG energy recovery and FIT for the user | distribution network | Fixed nominal regulated voltage | EPU output voltage is regulated so the DEG grid interface operates normally and excess DEG energy flows bidirectionally back to the distribution network. |

The EPU is designed specifically with a fast response so that rapid voltage changes, low frequency voltage changes, under voltage dips, overvoltage surges, overvoltage spikes and noise, and also voltage unbalance can be completely or largely eliminated. Particularly, voltage unbalance is a critical issue in poly-phase electrical systems. In a typical 3-phase system, even a 2% voltage unbalance between phases, delta or star connections, can badly deteriorate the efficiency, waste energy, drive higher temperatures, and significantly shorten the lifetime of, for example, AC poly-phase devices as motors, transformers, and ballasts. The present invention maintains the high power quality in electricity distribution network where DEG's are increasing common.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An electrical power distribution system with distributed energy generation (DEG), comprising:
    an electrical power distribution network;
    one or more energy processing units (EPU's) each being installed at an edge of a high voltage (HV) transmission grid of the electrical power distribution network, wherein the edge of the HV transmission grid being in between the HV transmission grid and a point of use (POU) or a point of common coupling (PCC);
    wherein each of the EPU's generates a regulated output voltage at its output from an unregulated input voltage in the electrical power distribution network at the EPU input;
    wherein each of the EPU's comprises a series voltage regulator without any internal energy storage device and generates its regulated output voltage using a series voltage regulation method combined with at least one of one or more power quality functions, wherein the series voltage regulator having a single conversion topology having no rectification;
    wherein each of the EPU's being electrical bidirectional allowing energy recovery of excess energy generated by one or more DEG devices installed at a POU or a PCC to be passed to the EPU input and onto the electrical power distribution network to be used by another POU with an EPU regulation set to receive the excess energy generated; and
    wherein the regulated output voltage at the output connection of each of the EPU's allowing continuous energy recovery when its unregulated input voltage is above a regulated upper limit;
    wherein at least one of the EPU's further comprises a series bypass contactor and achieves energy saving using a conservative voltage reduction method; wherein the conservative voltage reduction method comprises:
        passing the unregulated input voltage through the series voltage regulator when the unregulated input voltage is above the regulated upper limit; and
        passing the unregulated input voltage through the series bypass contactor when the unregulated input voltage is below the regulated upper limit.

2. The system of claim 1, wherein the edge of the HV transmission grid of the electrical power distribution network being one of:
    along sections of a low voltage (LV) distribution network of the electrical power distribution network,
    across a microgrid LV distribution network of the electrical power distribution network,
    along sections of the microgrid LV distribution network,
    across a power island LV distribution network, or
    along sections of the power island LV distribution network.

3. The system of claim 2, wherein the series voltage regulator in each of the EPU's comprises a series AC high frequency voltage regulator, wherein the series AC high frequency voltage regulator of each of the EPU's is configured to directly connect in series with the LV distribution network conductors.

4. The system of claim 3, wherein an input of the series AC high frequency voltage regulator of each of the EPU's is configured to connect to the LV distribution network conductors and an output of the series AC high frequency voltage regulator is configured to connect to a primary of a low frequency mains transformer; wherein a secondary of the low frequency mains transformer is connected in series with the LV distribution network conductors; and wherein the series AC high frequency voltage regulator is configured to process a differential power to change the AC voltage at the secondary of the low frequency mains transformer.

5. The system of claim 1, wherein the one or more power quality functions include power factor control, load balancing, voltage balancing, harmonic correction, and frequency control.

6. The system of claim 1, wherein the unregulated input voltage in the electrical power distributed network being allowed a tolerance of ±25% from nominal voltage change, ±10% from nominal voltage unbalance, ±10% from nominal voltage harmonics, low power factor corrected to more than 0.98, ±10% from nominal current unbalance, ±5% from nominal frequency deviation.

7. The system of claim 1, wherein the unregulated input voltage in the electrical power distributed network being allowed a tolerance higher than a legislated electrical power quality standard tolerance.

8. The system of claim 1, wherein at least one of the EPU's being equipped with bidirectional data communication means for data communication with power generators and power transmission operators in the electrical power distribution network.

9. The system of claim 1, wherein the series voltage regulator in at least one of the EPU's being a series alternate current high frequency voltage regulator and comprising:
    an AC high frequency (HF) series voltage buck power regulator topology for bucking an AC input voltage of an AC input power source, comprising:
        a first and a second independently controllable AC bidirectional switches,
        a first power inductor, and
        a first current transformer, connected in series with the first power inductor, for generating a first power inductor current direction data signal indicating the first power inductor current direction;
    an AC HF series voltage boost power regulator topology for boosting the AC input voltage, comprising:

a third and a forth independently controllable AC bidirectional switches, a second power inductor, and a second current transformer, connected in series with the second power inductor, for generating a second power inductor current direction data signal indicating the second power inductor current direction; and a control circuitry for receiving the AC input voltage, an AC reference voltage, the AC output voltage, the first power inductor current direction data signal, and the second power inductor current direction data signal, and generating switch driving signals for the AC bidirectional switches.

10. The system of claim 1, wherein the series voltage regulator in at least one of the EPU's being a series alternate current high frequency voltage regulator and comprising:

an AC high frequency (HF) series voltage buck power regulator topology for bucking an AC input voltage of an AC input power source, comprising:

a first unipolar path, comprising:

a first half-bridge, comprising a first and a second rectifier connected in series with a first and a second independently controllable unipolar switches respectively, and a first power inductor;

a second unipolar path, comprising:

a second half-bridge, comprising a third and a forth rectifiers connected in series with a third and a forth independently controllable unipolar switches respectively, and a second power inductor; and an AC HF series voltage boost power regulator topology for boosting the AC input voltage, comprising:

a third unipolar path, comprising:

a third half-bridge, comprising a fifth and a sixth rectifiers connected in series with a fifth and a sixth independently controllable unipolar switches respectively, and a third power inductor;

a forth unipolar path, comprising:

a forth half-bridge, comprising a seventh and an eighth rectifiers connected in series with a seventh and an eighth independently controllable unipolar switches respectively, and a forth power inductor; and a control circuitry for receiving the AC input voltage, an AC reference voltage, and the AC output voltage, and generating switch driving signals for the unipolar switches;

wherein positive and negative half cycles of AC input voltage being processed separately and independently in either the AC HF series voltage boost power regulator topology or the AC HF series voltage buck power regulator topology at any one time eliminating any power "shoot-through".

* * * * *